United States Patent
Britz et al.

(10) Patent No.: US 6,183,595 B1
(45) Date of Patent: Feb. 6, 2001

(54) PROCESS FOR TREATING A FIBROUS MATERIAL SUSPENSION USING COMBINATION OF LOW-INTENSITY AND HIGH-INTENSITY FLOTATION

(75) Inventors: Herbert Britz, Ravensburg-Weissenau; Herbert Holik; Martin Kemper, both of Ravensburg; Thomas Martin, Langenau; Anton Selbherr, Herbertingen; Harald Selder, Schlier, all of (DE)

(73) Assignee: Voith Sulzer Papiertechnik Patent GmbH, Ravensburg (DE)

(*) Notice: Under 35 U.S.C. 154(b), the term of this patent shall be extended for 0 days.

(21) Appl. No.: 09/110,017

(22) Filed: Jul. 2, 1998

(30) Foreign Application Priority Data

Jul. 3, 1997 (DE) .............................. 197 28 393

(51) Int. Cl.[7] ........................................................ D21B 1/08
(52) U.S. Cl. ............................... 162/4; 162/55; 162/261; 209/165; 210/259; 210/703
(58) Field of Search .................................. 162/4, 28, 55, 162/60, 261; 209/164, 165, 168, 169; 210/173, 259, 294, 322, 703

(56) References Cited

U.S. PATENT DOCUMENTS 5,417,806   5/1995   Matzke et al. ........................... 162/4

FOREIGN PATENT DOCUMENTS 4426159   12/1994   (DE) .
0537416   4/1993    (EP) .
60-134090  7/1985   (JP) .

OTHER PUBLICATIONS

H. Britz, "Flotationsdeinking—Grundlagen und Systemeinbindung," *Wochenblatt für Papierfabrikation*, 10, pp. 394–401 (1993).

Database WPI, Section Ch, Week 8540, Derwent Publications Ltd., Class F09, AN 85–245072.

*Primary Examiner*—Dean T. Nguyen
(74) *Attorney, Agent, or Firm*—Greenblum & Bernstein, P.L.C.

(57) ABSTRACT

The process targets the removal of interfering materials from an aqueous fibrous material suspension, especially if this is produced from recycled paper. Thereby interfering materials, such as printing ink particles, small synthetic particles, or sticky contamination, are eliminated by flotation in a particularly advantageous manner. In accordance with the invention, the combination of low-intensity and high-intensity flotation is undertaken, whereby the low-intensity flotation generally works in the gravitational field and the high-intensity flotation in a centrifugal field.

16 Claims, 3 Drawing Sheets

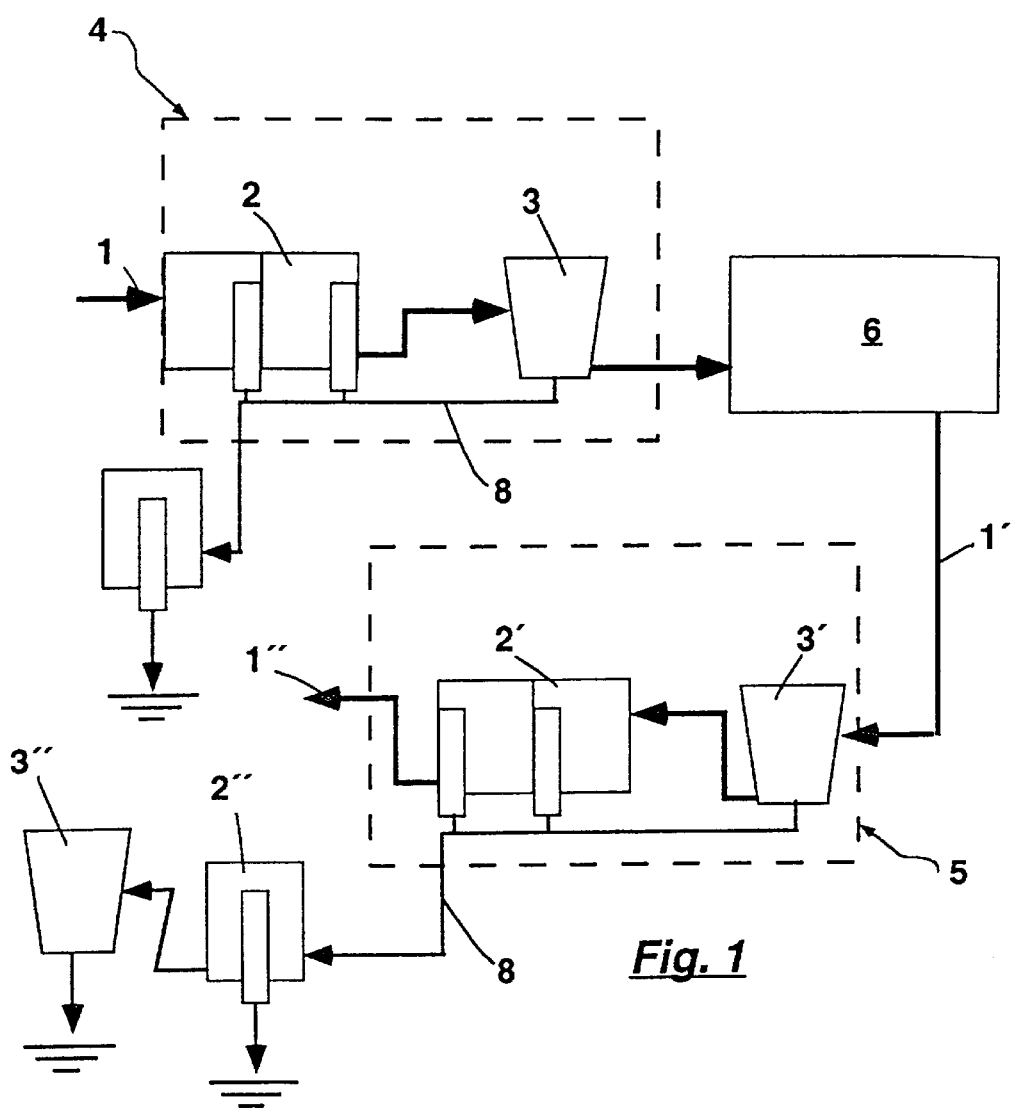
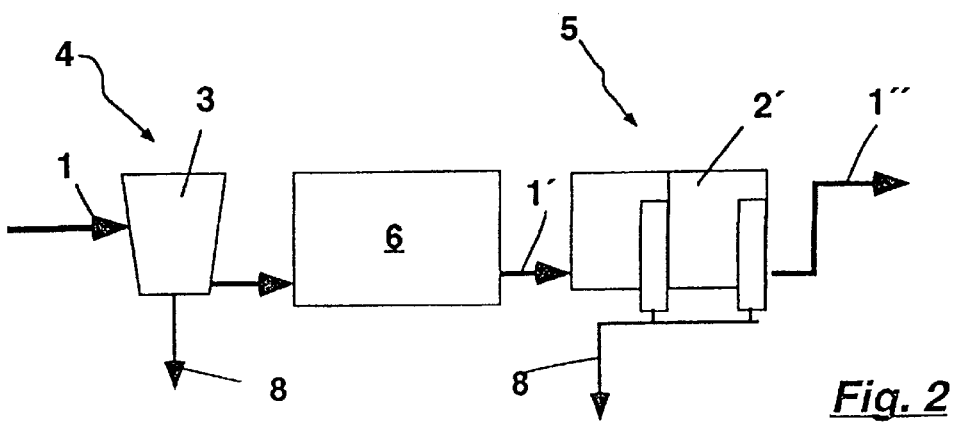

PROCESS FOR TREATING A FIBROUS MATERIAL SUSPENSION USING COMBINATION OF LOW-INTENSITY AND HIGH-INTENSITY FLOTATION

CROSS-REFERENCE TO RELATED APPLICATION

The present invention claims priority under 35 U.S.C. §119 of German Patent Application No. 197 28 393.4 filed on Jul. 3, 1997, the disclosure of which is expressly incorporated by reference herein in its entirety.

BACKGROUND OF THE INVENTION

1. Field of the Invention

The invention relates to a process and a facility to remove interfering materials from an aqueous fibrous material suspension with the aid of at least two flotation steps directly or indirectly subsequent to each other.

2. Discussion of Background Information

Processes of the noted type are used to eliminate at least a portion of the undesired solid matter particles suspended in a fibrous material suspension containing fibrous material. It is known that a foam or scum containing the materials to be eliminated is formed in a flotation. A common use of such a process is the preparation of an aqueous fibrous material suspension gleaned from printed recycled paper, in which the printing ink particles are already separated from fibers, so that the ink particles can be floated out. The flotation process described here utilizes the differences between fibrous material and undesired solid matter particles in such a way that the fibrous material remains in the fibrous material suspension, due to its rather hydrophilous character, while the already-mentioned solid matter particles are hydrophobic and reaches the foam with the air bubbles. Alongside the printing ink particles, there are other materials which are hydrophobic and thus can be separated by flotation from the fibrous material. In particular, such materials are adhesives, fine synthetic material particles, and perhaps also resins. Since fibers are separated from contaminations via the flotation process and not all fibrous material parts are sorted out, the term "selective flotation" may be appropriate. The likewise utilized term "flotation de-inking" is generally not only used for the removal of printing ink particles but rather more generally for the selective flotation of contaminations from fibrous material suspensions.

Cleaning procedures with two partial steps, a pre-flotation and a post-flotation and mechanical material treatment in the interim, have had a particularly good effect, such as is described in the subject matter essay "Flotationsdeinking— Grundlagen und Systemeinbindung," H. Britz, published in the *Wochenblatt für Papierfabrikation* 10–1983.

The prior art with respect to flotation procedures for fibrous material suspensions has already advanced quite far. Therefore, solutions exist which are certainly suited for removing a large portion of the interfering material particles by flotation. It is disadvantageous, however, when the spectrum of magnitude of the interfering material particles to be removed is very broad. In such cases, problems frequently appear, since the flotation facilities cannot always encompass the whole spectrum of particle size.

It is known that gas pockets will rise in a fluid against a gravity field. This field of gravity is due to the Earth's gravity and can be intensified significantly. In DE 44 26 159 A1, a procedure is described, in which the fibrous material suspension to be cleaned first reaches a flotation cyclone working with centrifugal force and then flotation cells of conventional construction, which, due to the field of gravity, work essentially alone. The flotation foam of the last-named flotation cells—perhaps also of the flotation cyclone—is cleaned in a further flotation cyclone which forms the secondary phase. This process works with the combination of different flotation steps, but it is not sufficient in some cases to produce a completely white de-inking material.

SUMMARY OF THE INVENTION

The invention therefore is directed to a flotation process which broadens the spectrum of the interfering material particles which have been floated out and an arrangement which performs the process.

At least two partial steps which are optimized to a respective special range of magnitude are arranged subsequent to one another. For example, in one partial step, the smaller particles which are present in the fibrous material suspension are floated out through an optimally predetermined high-intensity flotation device. Thereby, especially printing ink particles can be collected which were bonded to the fibers by oil-based binders. In cases in which a thickening device or washing device fitted with circulating continuous sieves (such as in accordance with DE 30 05 681) follows, such printing ink particles could contaminate the sieves and result in interferences. In addition, with high mechanical stress, such as in a subsequently arranged disperser, ink particles generally tend to become worked into the fibers such that they could then be removed only with great difficulty or even not at all. In both cases, the application of the high-intensity flotation arranged upstream of the disperser can produce effective remedial measures.

Even within the pre-flotation, that is, before the mechanical treatment, larger particles can additionally be removed in a low-intensity flotation. Then, it is advantageous to select the sequences such that the low-intensity flotation can be started to remove the larger particles first. Otherwise, these would have unnecessary gas pockets in the high-intensity flotation, without being removed. Generally, however, this sequence is arbitrary. Similar considerations are also to be made with a two-step post-flotation.

In other cases, in which no such fine particles are present in the fibrous material suspension, which are altered disadvantageously in the mechanical treatment, the pre-flotation can be merely a low-intensity flotation, for example, a pre-flotation that can work in the earth's gravity and the post-flotation can be a strong flotation, e.g., a centrifugal field, a low-intensity flotation, or a combination of high and low intensity flotations.

After the first flotation step, the pre-flotation, the interfering material particles which have not yet been removed from the fibers or which are otherwise fixed are removed mechanically.

Thereby, due to the lack of the already-removed particles, it need no longer be feared that these particles will become smaller or that they will be worked into the fibers and, thus, they are no longer necessary to be removed or at least, not at an increased cost.

Thus, in accordance with the foregoing, an object of the present invention is to provide a process for removing material from an aqueous fibrous material suspension. The process includes subjecting the aqueous fibrous material to a flotation process while under a low-intensity gravitational effect. The material is processed to remove fibers from the aqueous fibrous material and the aqueous fibrous material is subjected to a second flotation process while under a high-intensity gravitational effect. A mechanical processing is performed between the first and second flotation processes.

Another object of the invention includes performing the low-intensity flotation process before the high-intensity flotation process.

A further object of the invention is to remove material from the aqueous fibrous suspension while performing the high-intensity flotation process before the low-intensity flotation process.

Yet another object of the present invention includes performing a pre-flotation step and a post-flotation step corresponding to the low-intensity flotation process and the high-intensity flotation process while the mechanical process is performed between performance of the pre-flotation process and the post-flotation process.

Another object of the present invention is to perform the pre-flotation step following the low-intensity flotation process and performing the post-flotation step following the high-intensity flotation process. Again, the mechanical process being performed between the pre and post-flotation processes.

Another object of the present invention includes the pre-flotation step having both a high-intensity flotation process and a low-intensity flotation process with the mechanical processing being performed between the pre and post-flotation steps.

A further object of the present invention is to perform the process including a pre and post-flotation step in which a high-intensity flotation process and a low-intensity flotation process are performed in each step with the mechanical process being performed between the pre-flotation process and the post-flotation process.

Yet another object of the present invention includes producing a flotation foam in at least one of the pre and post-flotation steps and, guiding the foam into a secondary flotation step so that the secondary flotation step includes the low-intensity flotation process and the high-intensity flotation process.

Another object of the present invention includes performing the low-intensity flotation process in a gravitational field.

Another object of the present invention is to perform the high-intensity flotation process in a gravitational field in which the gravitational field is produced by centrifugal force, the centrifugal force being at least two times the strength of the gravitational field. The centrifugal force can be greatly increased above the two-fold increase and may be at least a ten-fold increase in the gravitational effects, due to the use of centrifugal force.

Another object of the present invention includes performing the process by guiding the fibrous material suspension into a substantially cylindrical tank so that a rotational flow is created and that the flotation foam and the aqueous fibrous material suspension have a common axial direction of flow. The process may also include an object of providing the flow of the material suspension and the flotation foam in opposite axial directions.

Another object of the present invention includes concentrating the fibrous material to at least 15% dry content and subsequently processing the fibrous material by dispersing the fibrous material during the mechanical process.

Another object of the present invention is to provide a facility for performing the processing of the aqueous fibrous material suspension. The physical layout of the facility includes a material dissolver, a cleaning section, a pre-flotation processor, a concentrator, a disperser and a post-flotation processor. The facility permits a fibrous material suspension to be produced in the dissolver by a mixture of water and paper material. The suspension can then be passed to a cleaning section, with the pre-flotation processor providing a suspension stock to the concentrator and the disperser. The physical layout of the facility then permits the suspension to be guided from the dissolver to a selectively operable flotation cell and at least one subsequent flotation cyclone.

Another object of providing a physical layout for a facility to process a material suspension comprises the addition of a hyrocyclone located downstream of the dissolver.

A further object of the present invention includes providing a fiberizing section downstream of the dissolver.

Yet another object of the present invention is to provide a material calefaction section located between the concentrator and the disperser.

A further object of the present invention is to include at least one secondary flotation phase for both the pre and post-flotation processes so as to clean flotation foam produced in the pre and post-flotation process.

Yet another object of the invention is to provide at least one secondary flotation phase to include a flotation cell and a flotation cyclone.

BRIEF DESCRIPTION OF THE DRAWINGS

The present invention is further described in the detailed description which follows, in reference to the noted drawings by way of non-limiting examples of preferred embodiments of the present invention, wherein the same reference numerals represent similar parts through the several views of the drawings, and wherein:

FIG. 1 is a diagram of a process in accordance with the invention;

FIG. 2 is a diagram of a simplified pre-flotation section;

FIG. 6b is a top view of the flotation device of FIG. 6a; and

DETAILED DESCRIPTION OF THE PREFERRED EMBODIMENTS

Figure 3:
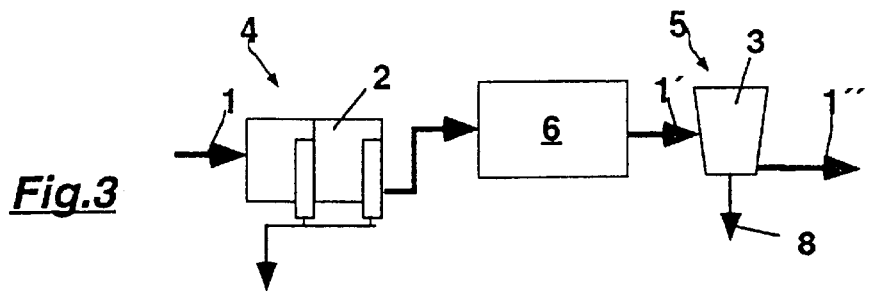
FIG. 3 is a variation of the process of FIG. 1.

The particulars shown herein are by way of example for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for the fundamental understanding of the invention, the description taken with the drawings making apparent to those skilled in the art how the several forms of the invention may be embodied in practice.

In accordance with FIG. 1, the aqueous fibrous material suspension 1 containing interfering material particles is cleaned in the pre-flotation section 4, whereby the section 4 is divided into two partial steps subsequent to one another, namely an upstream low-intensity field flotation 2 and a downstream high-intensity flotation 3. The sequence of these two partial steps is, as executed, optimal in most cases, but the sequence can be switched in other cases. The pre-cleaned flotation thus reaches a mechanical processing portion 6 thereafter, in which some interfering material particles have yet to be dissolved. It is advantageous if a high-consistency dispersement is involved, which can be executed at normal temperatures or temperatures of approximately 100° C. or more. Instrumentally, dispersers or kneaders with toothed disks, to name two examples, can be used. The mechanically treated fibrous material suspension 1' is guided into the post-flotation section 5 thereafter, which essentially serves to remove by flotation the previously detached or removed interfering material particles. In the example depicted here, the post-flotation section 5 is divided into two partial steps, an upstream high-intensity flotation 3' and a subsequent low-intensity flotation 2'. As in pre-flotation section 4, another sequence is again feasible. Due to the generally smaller size spectrum of the interfering materials in comparison to the fibrous material suspension 1 in the pre-flotation section, using the high-intensity flotation 3' in the post-flotation section 5 can suffice in many cases. The fibrous material suspension 1", which results at the end of the post-flotation as acceptable stock, is of high whiteness and cleanness in the process executed to that end. As is known, the flotation foam 8, which forms in the pre-flotation and the post-flotation, is subject to another flotation treatment, in order to concentrate the interfering material and to retrieve the fibers unintentionally removed with the foam. Even in these separation steps, which are characterized as a secondary phase, the combination of different flotation principles can be used advantageously. Thus, for example, a sequence of low-intensity flotation 2" and high-intensity flotation 3" are shown for the secondary phase of the post-flotation 5 section.

FIG. 2 is a simplified diagram, in which the pre-flotation section 4 is performed only in a high-intensity flotation 3 and the post-flotation 5 is performed in a low-intensity flotation 2'. Such a sequence is especially practical if the interfering material particles which are present in the fibrous material suspension 1 and which have already been removed are of relatively small size and would be disadvantageously transformed in the mechanical processing portion 6. The post-flotation section 5 following after the processing portion 6 is then suited to float the particles of relatively large size which have been removed from the fibers in the mechanical processing phase. The same applies for such particles, for example adhesives, which only maintain a flotationally active form or surface structure through the mechanical processing portion 6. In other cases, the sequence shown in FIG. 3 is very advantageous, especially if a correspondingly large amount of large, but still floatable, interfering material particles, which would be made smaller in a mechanical processing phase and/or would be worked into the fibers, is present in the fibrous material suspension 1. In FIG. 3 the fibrous material suspension 1 flows to a pre-flotation section 4. Therein, the suspension is subjected to a low-intensity flotation process and is subsequently transferred to a mechanical processing portion 6. The mechanically treated fibrous material suspension 1' then flows to a post-flotation section 5 which subjects the suspension to a high-intensity process 3. The resulting fibrous material suspension 1" is produced with a high level of whiteness and cleanness and the flotation foam is removed.

Figure 4:
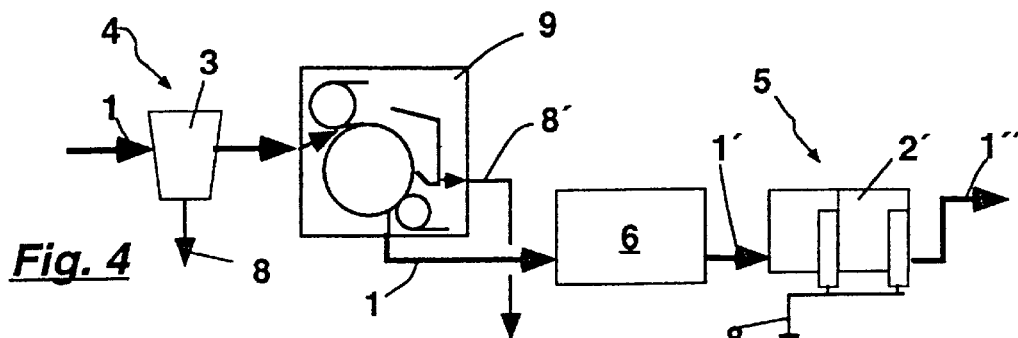
FIG. 4 is a diagram of a washing procedure.

In accordance with the diagram of FIG. 4, a washing procedure 9 is staged in between the pre-flotation section 4 and the mechanical processing portion 6, in order to rinse out the finest particles together with the filtrate 8', that is, largely independent of its hydrophilic/hydrophobic property. The filters or sieves needed for this are protected from contamination by the prior high-intensity flotation, which encompasses especially well the sticky, unstable, and soft interfering material particles.

Figure 5:
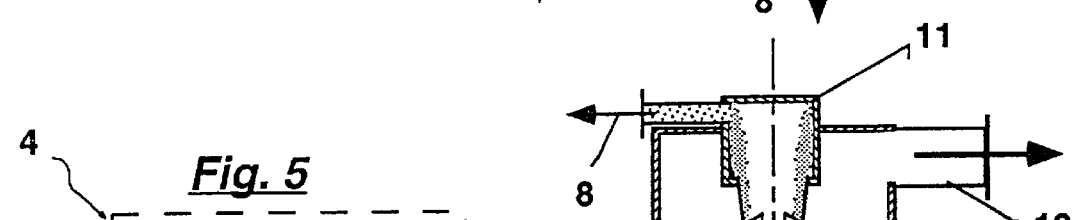
FIG. 5 is a diagram of a secondary phase of a process shown in FIG. 1.

In FIG. 5, an embodiment of the secondary phase is shown, in which the foam 8, which for example comes from the pre-flotation section 4, is introduced respectively into the type of flotation devices which work according to the same principle of flotation with respect to a high-intensity gravitational field. Thus, the flotation foam which is produced in the weak gravitational field is likewise treated subsequently with a low-intensity flotation and that from the high-intensity flotation is treated thereafter with a high-intensity gravitational field. Similar considerations are of course possible, for the post-flotation.

Figure 6A:
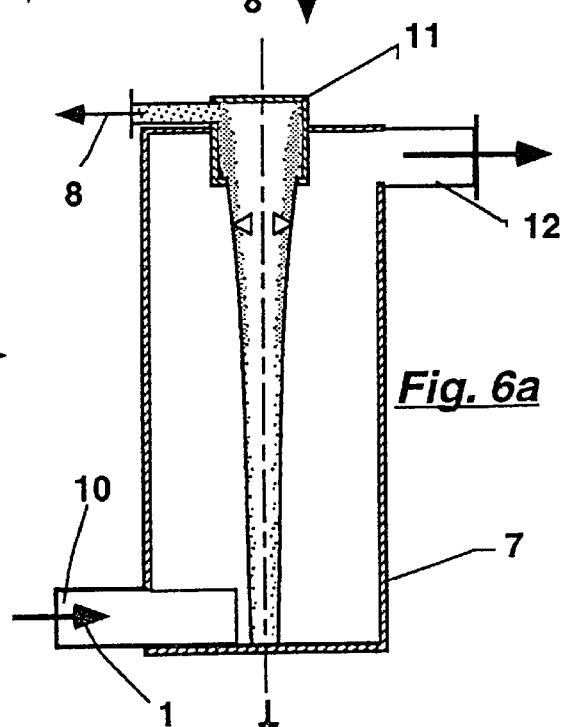
FIG. 6a is a schematic of a flotation device in the process of FIG. 1.
Figure 6B:
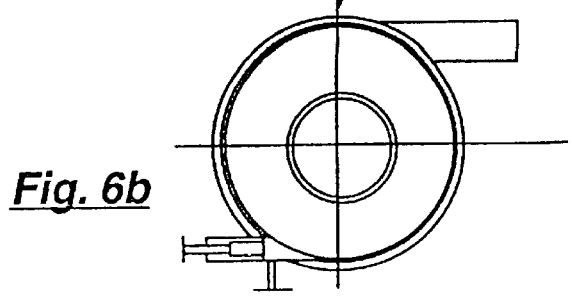

FIG. 6a shows by way of example a flotation device, with which a high-intensity flotation can be executed. FIG. 6a shows an essentially cylindrical tank with a substantially enclosed wall 7. The fibrous material suspension 1 is introduced through the tangential inlet 10, so that together with the curvature of the wall 7, a rotational flow results. The supply and mixture of the flotation air in the fibrous material suspension is not depicted here, as it is sufficiently known. As a result of the centrifugal field, the flotation foam collects essentially in the center of the flotation facility. It flows in an axial direction upward, whereby in the example shown here, the transport flow of the fibrous material suspension runs likewise axially upward through the tank. Thus, both the foam discharge 11 and the accepted stock discharge 12 are located in the upper area of the flotation device. For clarity, the flotation device shown in FIG. 6a is depicted in a top view in FIG. 6b.

In many cases, several flotation devices subsequent or in series to one another are to be planned for a processing step, such as pre-flotation, post-flotation, or secondary stages.

Figure 7:
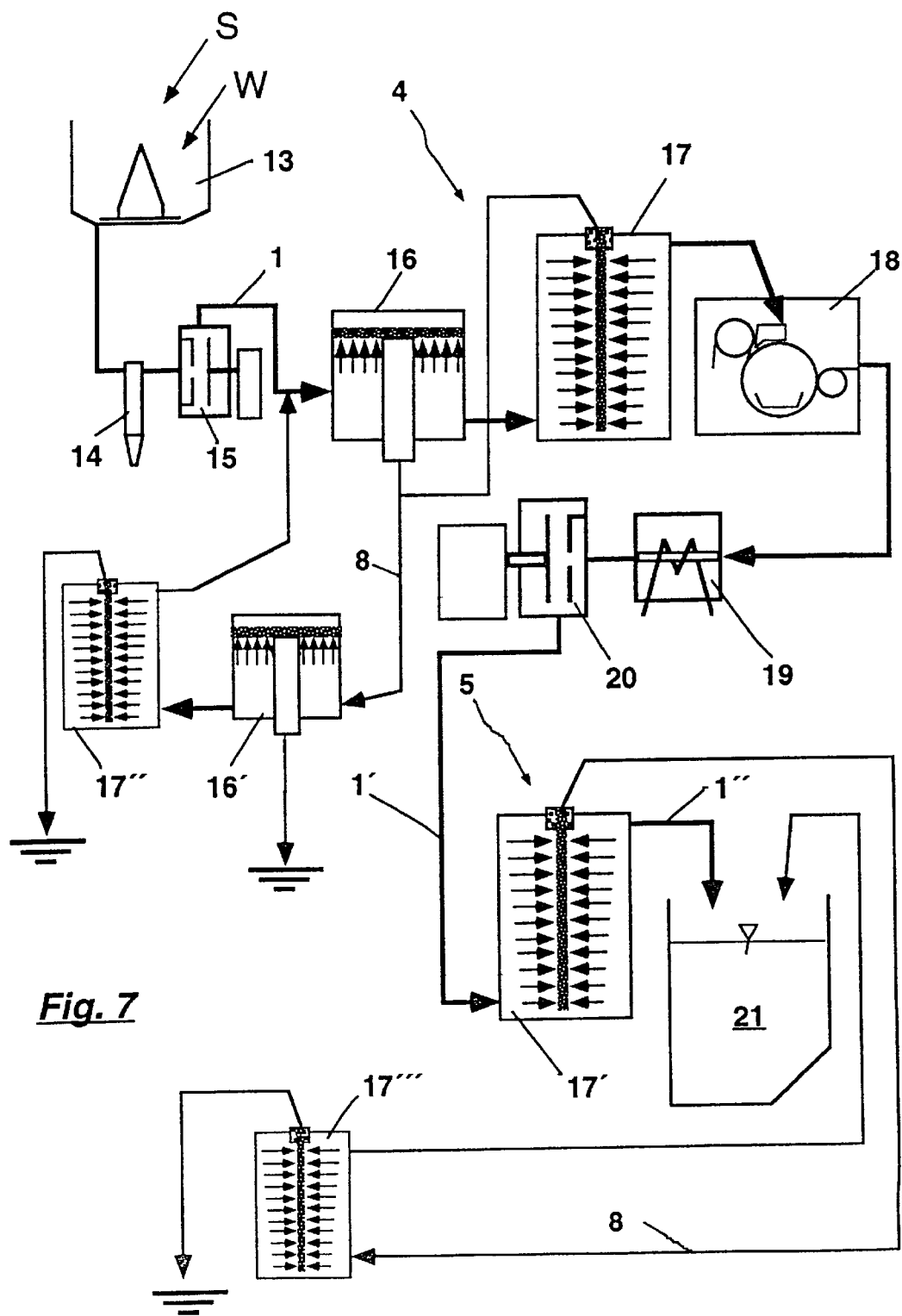
FIG. 7 is a schematic representation of a physical arrangement for performing the process of FIG. 1.

In FIG. 7, a mechanism is depicted schematically with which the process can be executed in an advantageous manner. A material dissolver/solutizer, embodied here as a high-consistency material dissolver, which mixes the paper fibrous material S introduced with a material consistency of at least 12% with the water W, whereby the chemicals necessary for flotation can at least be partially supplied. The material dissolver 13 can be run so that an extensive fiberizing/deflaking of the paper material occurs. It is also feasible, however, to execute that in a fiberizer 15 arranged subsequently. Dissolution, possible chemical activity and fiberizing must be undertaken enough so that at least a note-worthy portion of the interfering materials therein, such as printing ink particles, is detached. Generally, especially when using recycled paper, a hydrocyclone 14 will also be practical, in order to eliminate coarse, heavy particles. The different aggregates of the depicted facility generally require suspensions with particular material consistencies, that is, dry contents. Measures for their adjustment are known and will only be illustrated in special cases here. The fibrous material suspension 1, which has been sufficiently fiberized and cleaned, reaches a flotation cell 16 operated in a gravitational field, in which the suspension mixed with air forms a foam 8 which is led away. The accepted stock of the flotation cell 16 is led into the flotation cyclone 17, the effect of which as a high-intensity flotation has already been described. The flotation foam 8 which results therein now reaches the secondary phase together with the flotation cell 16. The accepted stock is thickened in the concentration device 18, e.g., in a sieve press, and thereafter brought to a predetermined temperature in the material calefaction device 19, and then dispersed in the disperser 20. As already described, the disperser 20 serves, among other things, to remove the interfering materials still clinging to the fibers, such that in the subsequent flotation cyclone 17', these can also be floated and removed together with the foam 8. The accepted stock of the flotation cyclone 17 comes into the spare vat 21 and is available as white, clean paper fibrous material for producing new paper. The foam 8 resulting in the post-flotation section 5 reaches a further secondary phase. In the example shown here, the secondary phase of the pre-flotation section 4 is again equipped with two differently working flotation devices, namely a flotation cell 16' operated in the gravitational field and a connecting flotation cyclone 17". The secondary flotation phase of the post-flotation section 5 simply contains at least one flotation cyclone 17".

It is noted that the foregoing examples have been provided merely for the purpose of explanation and are in no way to be construed as limiting of the present invention. While the invention has been described with reference to a preferred embodiment, it is understood that the words which have been used herein are words of description and illustration, rather than words of limitation. Changes may be made, within the purview of the appended claims, as presently stated and as amended, without departing from the scope and spirit of the invention in its aspects. Although the invention has been described with reference to particular means, materials and embodiments, the invention is not intended to be limited to the particulars disclosed herein; rather, the invention extends to all functionally equivalent structures, methods and uses, such as are within the scope of the appended claims.

What is claimed is:

1. A process for removing fibers from a material in an aqueous fibrous material suspension comprising:

subjecting the aqueous fibrous material suspension to at least two flotation processes;

performing one of the at least two flotation processes under a low-intensity gravitational field effect as a low-intensity flotation process;

performing another of the at least two flotation processes under a high-intensity gravitational field effect as a high-intensity flotation process; and processing the material to remove fibers, wherein the processing is a mechanical process occurring between the at least two flotation processes.

2. The process in accordance with claim 1, wherein the low-intensity flotation process precedes the high-intensity flotation process.

3. The process in accordance with claim 1, wherein the high-intensity flotation process precedes the low-intensity flotation process.

4. The process in accordance with claim 3, wherein a pre-flotation step and a post-flotation step are performed, the pre-flotation step following the low-intensity flotation process and the post-flotation step follows the high-intensity flotation process, the mechanical process being performed between the pre-flotation step and the post-flotation step.

5. The process in accordance with claim 3, wherein a pre-flotation step and a post flotation step are performed, the pre-flotation step including both the high-intensity flotation process and the low-intensity flotation process, the mechanical process being performed between the pre-flotation step and the post-flotation step.

6. The process in accordance with claim 3, wherein a pre-flotation step and a post-flotation is performed, the post-flotation step including both the high-intensity flotation process and the low-intensity flotation process, the mechanical process being performed between the pre-flotation process and the post-flotation process.

7. The process in accordance with claim 1, wherein a pre-flotation step and a post-flotation step are performed, the pre-flotation step being the low-intensity flotation process and the post-flotation process being the high-intensity flotation process, the mechanical process being performed between the pre-flotation process and the post-flotation process.

8. The process in accordance with claim 1, wherein a pre-flotation step and a post flotation step are performnned, the pre-flotation step including both the high-intensity flotation process and the low-intensity flotation process, the mechanical process being performed between the pre-flotation step and the post-flotation step.

9. The process in accordance with claim 1, wherein a pre-flotation step and a post-flotation is performed, the post-flotation step including both the high-intensity flotation process and the low-intensity flotation process, the mechanical process being performed between the pre-flotation process and the post-flotation process.

10. The process in accordance with claim 1, further comprising:

producing a flotation foam in at least one of the high-intensity flotation process and the low-intensity flotation process; and guiding the foam into a secondary flotation process, wherein the secondary flotation process includes the low-intensity flotation process and the high-intensity flotation process.

11. The process in accordance with claim 10, further comprising:

performing the high-intensity flotation process by guiding the fibrous material suspension into a substantially cylindrical tank so that a rotational flow is created; and wherein the flotation foam and the aqueous fibrous material suspension have a common axial direction of flow.

12. The process in accordance with claim 10, further comprising:

performing the high-intensity flotation process by guiding the fibrous material suspension into a substantially cylindrical tank so that a rotational flow is created; and wherein the flotation foam and the aqueous fibrous material suspension have contrasting directions of flow.

13. The process in accordance with claim 1, further comprising:

concentrating the fibrous material to at least 15% dry content; and processing the fibrous material by dispersing the fibrous material during the mechanical process.

14. A process for removing interfering materials from an aqueous fibrous material suspension comprising:

subjecting the aqueous fibrous material suspension to at least two flotation processes;

performing one of the at least two flotation processes under a low-intensity gravitational field effect as a low-intensity flotation process in a gravitational field;

performing another of the at least two flotation processes under a high-intensity gravitational field effect as a high-intensity flotation process; and processing the material to remove fibers, wherein the processing is a mechanical process occurring between the at least two flotation processes.

15. A process for removing fibers from a material in an aqueous fibrous material suspension comprising:

subjecting the aqueous fibrous material suspension to at least two flotation processes;

performing one of the at least two flotation processes under a low-intensity gravitational field effect as a low-intensity flotation process;

performing another of the at least two flotation processes under a high-intensity gravitational field effect as a high-intensity flotation process in a gravitational field;

producing the gravitational field by centrifugal force, wherein the centrifugal force is at least a two-fold increase in the gravitational field; and processing the material to remove fibers, wherein the processing is a mechanical process occurring between the at least two flotation processes.

16. The process in accordance with claim 15, wherein the centrifugal force is at least a ten-fold increase in the gravitational field.

* * * * *